United States Patent
Ito et al.

(10) Patent No.: US 8,942,534 B2
(45) Date of Patent: Jan. 27, 2015

(54) INFORMATION PROCESSING APPARATUS, INFORMATION PROCESSING METHOD, PROGRAM, AND INFORMATION PROCESSING SYSTEM

(75) Inventors: Shin Ito, Tokyo (JP); Yoshinori Ohashi, Tokyo (JP); Eiju Yamada, Kanagawa (JP); Tatsuya Narahara, Kanagawa (JP); Akihiko Kinoshita, Tokyo (JP)

(73) Assignee: Sony Corporation (JP)

( * ) Notice: Subject to any disclaimer, the term of this patent is extended or adjusted under 35 U.S.C. 154(b) by 382 days.

(21) Appl. No.: 12/927,143

(22) Filed: Nov. 8, 2010

(65) Prior Publication Data

US 2011/0135270 A1 Jun. 9, 2011

(30) Foreign Application Priority Data

Dec. 4, 2009 (JP) ................ P2009-276946

(51) Int. Cl.
*H04N 5/65* (2006.01)
*G06F 17/30* (2006.01)

(52) U.S. Cl.
CPC .............. *G06F 17/30864* (2013.01)
USPC ....................................... 386/200

(58) Field of Classification Search
None
See application file for complete search history.

(56) References Cited

U.S. PATENT DOCUMENTS

| | | | |
|---|---|---|---|
| 2002/0103786 A1* | 8/2002 | Goel | 707/3 |
| 2002/0152222 A1* | 10/2002 | Holbrook | 707/104.1 |
| 2004/0220905 A1* | 11/2004 | Chen et al. | 707/3 |
| 2005/0203918 A1* | 9/2005 | Holbrook | 707/10 |
| 2006/0161542 A1* | 7/2006 | Cucerzan et al. | 707/5 |
| 2006/0242128 A1* | 10/2006 | Goel | 707/3 |
| 2008/0301562 A1* | 12/2008 | Berger et al. | 715/733 |
| 2010/0114916 A1* | 5/2010 | Cooke | 707/752 |
| 2012/0095992 A1* | 4/2012 | Cutting et al. | 707/722 |

FOREIGN PATENT DOCUMENTS

| | | |
|---|---|---|
| EP | 1209583 A2 | 5/2002 |
| JP | 2006-285526 A | 10/2006 |
| WO | 2007044313 A1 | 4/2007 |

OTHER PUBLICATIONS

European Search Report EP 10192798, Apr. 6, 2011.

* cited by examiner

*Primary Examiner* — Hung Dang
*Assistant Examiner* — Sunghyoun Park
(74) *Attorney, Agent, or Firm* — Lerner, David, Littenberg, Krumholz & Mentlik, LLP

(57) ABSTRACT

There is provided an information processing apparatus including a search information notification section which notifies a search device of search information via a communication section, a search result acquisition section which acquires a plurality of search result pages retrieved from a plurality of search pages, respectively, in accordance with the search information, from the search device via the communication section, and a display control section which causes a display section to display one of the plurality of search result pages acquired by the search result acquisition section from the search device, and which causes the display section to display another one of the plurality of search result pages based on the operation information an input of which is accepted by an input section.

20 Claims, 9 Drawing Sheets

FIG. 6
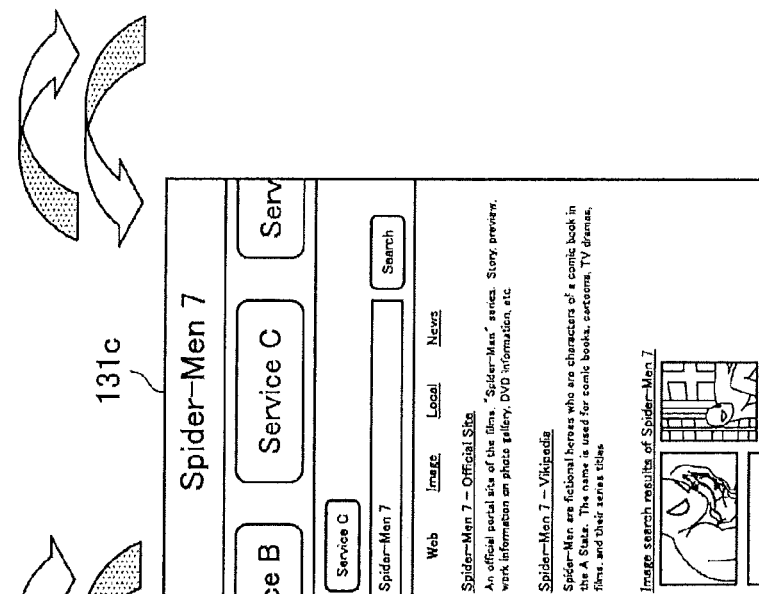
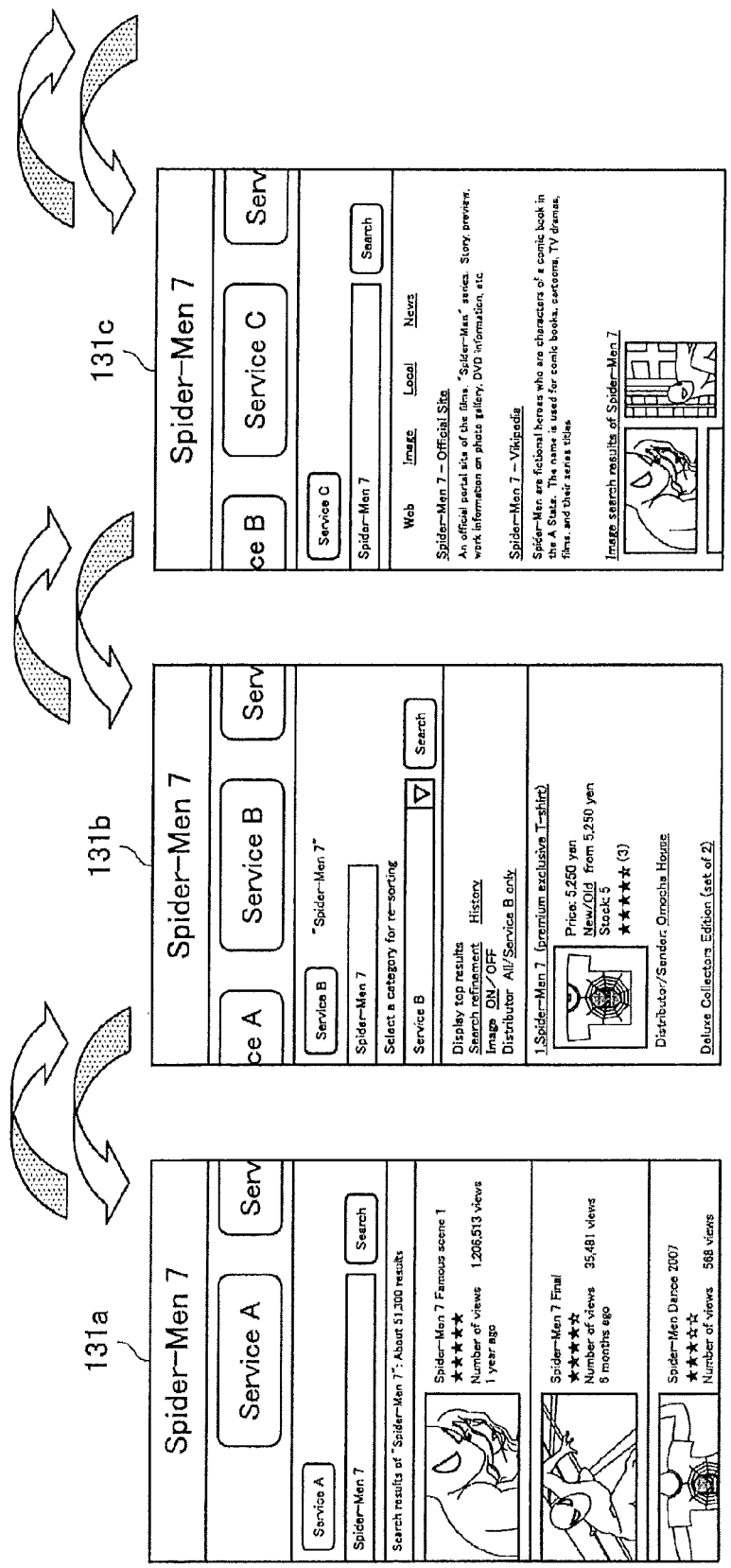

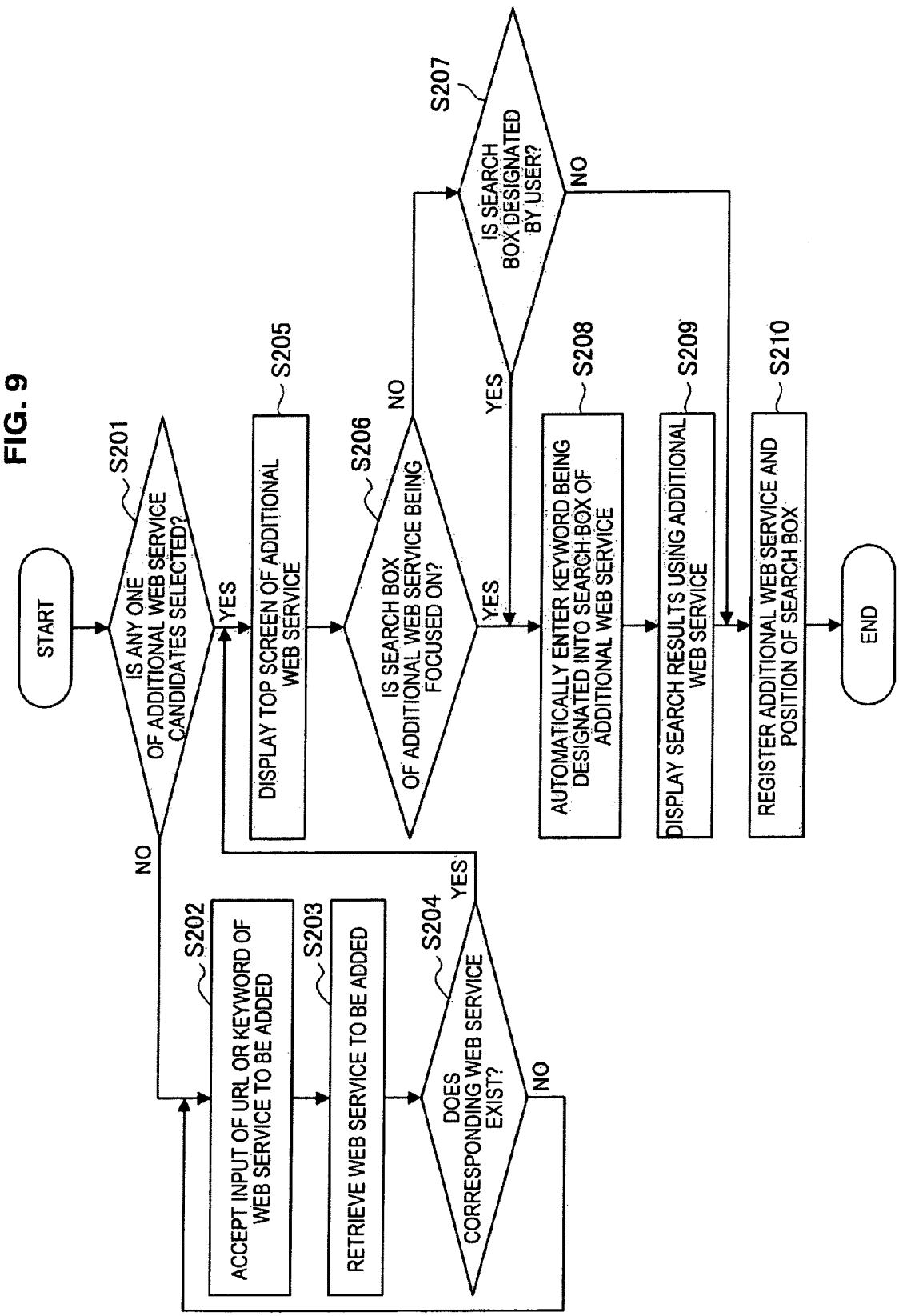

INFORMATION PROCESSING APPARATUS, INFORMATION PROCESSING METHOD, PROGRAM, AND INFORMATION PROCESSING SYSTEM

CROSS-REFERENCE TO RELATED APPLICATION

The present application claims priority from Japanese Patent Application No. JP 2009-276946 filed in the Japanese Patent Office on Dec. 4, 2009, the entire content of which is incorporated herein by reference.

BACKGROUND OF THE INVENTION

1. Field of the Invention

The present invention relates to an information processing apparatus, an information processing method, a program, and an information processing system.

2. Description of the Related Art

Recently, there have been known many websites which are published on the Internet. A website refers to entire web pages which are run inside a specific domain, and in most cases, a website has a top page which corresponds to an entrance of the website and a web page which can be reached by following a link from the top page.

Among websites, there are known many search sites each having a function of searching a web page. There are various algorithms which are used when a search site performs a search, and in most cases, different search results are obtained depending on the search site to be used. There are disclosed various technologies for simplifying operation of a user and performing a search (for example, refer to JP-A-2006-285526).

Further, in addition to the search sites each having a function of searching a web page, there are many search sites which provide search results. For example, there are: a search site, which provides as search results, pieces of information related to a commercial product that can be purchased by a user; a search site, which provides as search results, pieces of moving image information that can be viewed by the user; and a search site, which provides as search results, pieces of text information including a content that the user wants to research. Owing to the presence of the search sites which provides those search results, the user can easily obtain desired information.

SUMMARY OF THE INVENTION

However, when viewing search results retrieved from multiple search sites, it is necessary that the user perform operations of entering search information and pressing search button for respective search pages provided by the multiple search sites. There was an issue that burdens of performing those operations were imposed on the user.

In light of the foregoing, it is desirable to provide a novel and improved technology which enables a user to easily view respective search results retrieved and obtained from multiple search sites based on the same piece of search information.

According to an embodiment of the present invention, there is provided an information processing apparatus which includes an input section which accepts an input of operation information from a user, a communication section which communicates via a network with a search device holding a plurality of search pages for providing search results, a display section, a search information notification section which notifies the search device of search information via the communication section, a search result acquisition section which acquires a plurality of search result pages retrieved from the plurality of search pages, respectively, in accordance with the search information, from the search device via the communication section, and a display control section which causes the display section to display one of the plurality of search result pages acquired by the search result acquisition section from the search device, and which causes the display section to display another one of the plurality of search result pages based on the operation information an input of which is accepted by the input section.

The information processing apparatus may further include a storage section which stores a plurality of pieces of search page position information indicating positions of the plurality of search pages in the network, respectively. The search information notification section may acquire the plurality of pieces of search page position information stored in the storage section, may acquire the plurality of search pages located at positions indicated by the acquired plurality of pieces of search page position information, respectively, and may notify the search device of the search information by using the acquired plurality of search pages.

The storage section may store search information-entry position information, which indicates a position of a search information-entry field in the search page located at a position indicated by each of the plurality of pieces of search page position information, and which is correlated with each of the plurality of pieces of search page position information. The search information notification section may further acquire the search information-entry position information which is correlated with each of the plurality of pieces of search page position information and stored in the storage section, and may further notify the search device of the acquired search information-entry position information.

The information processing apparatus may further include an additional processing section which adds new search page position information to the plurality of pieces of search page position information stored in the storage section.

The additional processing section may acquire a new search page located at a position indicated by the new search page position information, may acquire, from the acquired new search page, search information-entry position information indicating a position of a search information-entry field in the new search page, and may cause the storage section to store the acquired search information-entry position information which is correlated with the new search page position information.

The additional processing section may cause the display section to display the acquired new search page, may specify an entry field being focused on in the new search page displayed by the display section, and may determine that the specified entry field is the search information-entry field.

The additional processing section may notify the search device of the search information and the acquired search information-entry position information via the communication section.

The storage section may further store candidate search page position information which is a candidate for the new search page position information. When the additional processing section determines that the candidate search page position information is selected based on the operation information an input of which is accepted by the input section, the additional processing section may add the candidate search page position information, which is determined to have been selected, to the plurality of pieces of search page position information.

According to the embodiment of the present invention described above, it is possible to easily view respective search results retrieved and obtained from multiple search sites based on the same piece of search information.

BRIEF DESCRIPTION OF THE DRAWINGS

FIG. 6 is a diagram showing an example of screen transition between search result display screens which are displayed by the information processing apparatus according to the embodiment;

FIG. 9 is a flowchart showing a flow of web service registration processing executed by the information processing apparatus according to the embodiment.

DETAILED DESCRIPTION OF THE EMBODIMENTS

Figure 1:
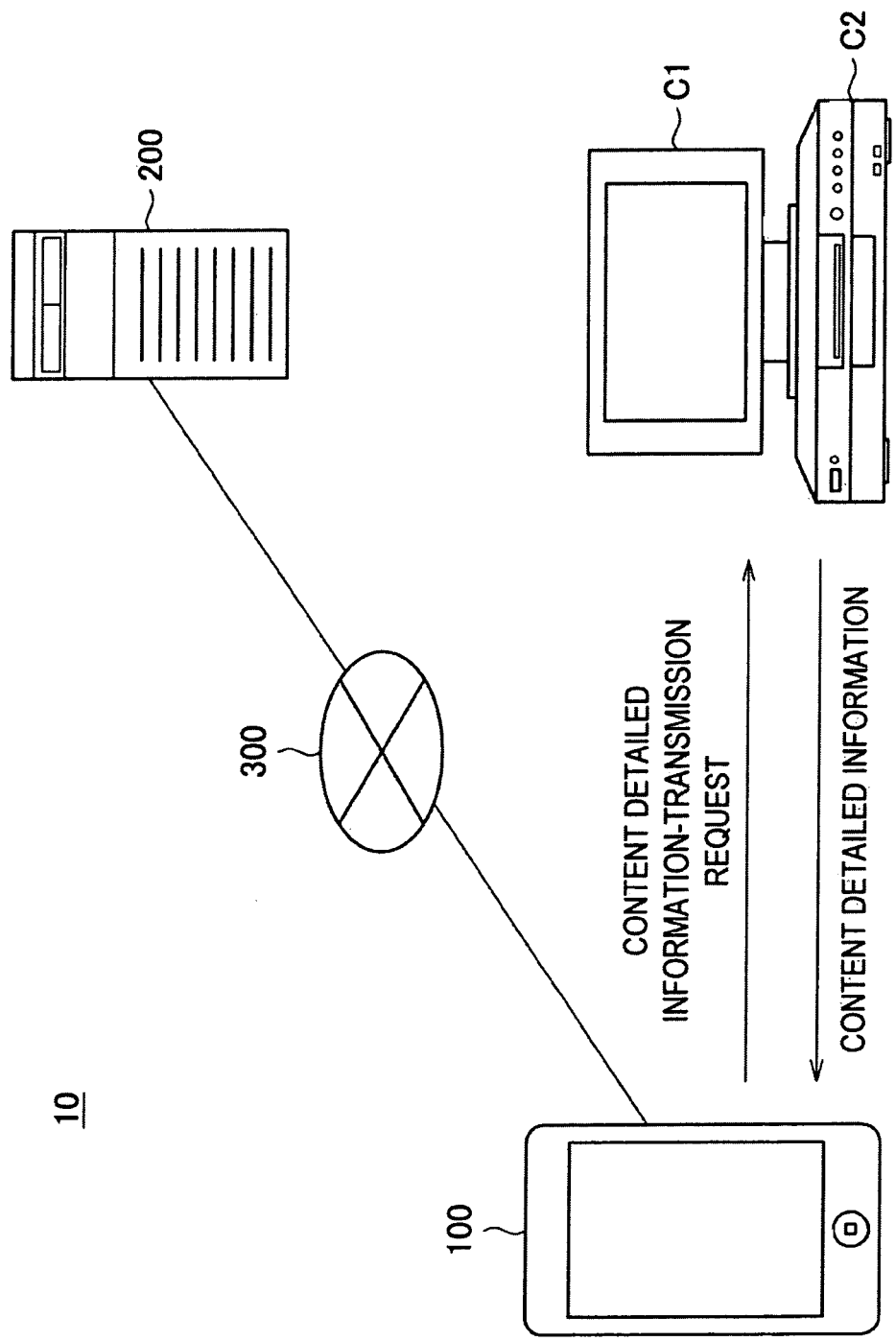
FIG. 1 is a diagram showing a configuration of an information processing system according to a first embodiment of the present invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

Note that the description will be given in the following order.

1. First embodiment
 1-1. Configuration of information processing system
 1-2. Functional configuration of information processing apparatus
 1-3. Functional configuration of search device
 1-4. Screen transition between content detailed information display screen and search result display screen
 1-5. Configuration example of search result display screen
 1-6. Example of screen transition between search result display screens
 1-7. Example of screen transition between search result display screen and registration screen
 1-8. Search processing executed by information processing system
 1-9. Web service registration processing executed by information processing apparatus
2. Modified example
3. Summary

1. First Embodiment

1-1. Configuration of Information Processing System

FIG. 1 is a diagram showing a configuration of an information processing system according to an embodiment of the present invention. With reference to FIG. 1, the configuration of the information processing system according to the embodiment will be described.

As shown in FIG. 1, an information processing system according to an embodiment of the present invention includes an information processing apparatus 100 and a search device 200 which holds multiple search pages for providing search results to the information processing apparatus 100. The number of search results is not particularly limited. The information processing apparatus 100 and the search device 200 can perform communication via a network 300 such as the Internet.

The information processing apparatus 100 transmits search information such as a keyword to the search device 200 via the network 300, and receives search results retrieved by using each of the multiple search pages from the search device 200. In the present embodiment, the case of using a keyword as an example of the search information will be described, but the search information is not limited to a keyword, and may be any as long as the search information is a search condition used for acquiring search results. The search page is used for setting search information necessary for a search site to perform a search. For example, a top page of a search site can be used for the search page. The search site is a website which has a search function among websites. Examples of the search site include a website which has a function of searching a web page, a website which provides as search results information related to a commercial product that can be purchased by a user, a website which provides as search results moving image information that can be viewed by the user, and a website which provides as search results text information including a content that the user wants to research.

The form of the hardware of the information processing apparatus 100 may be any, and examples thereof include mobile information terminals such as a PC, a mobile phone, and a PDA (Personal Digital Assistant), game machines, and various home information appliances. In the present embodiment, there will be described a case where the information processing apparatus 100 is a mobile information terminal which includes a touch panel input device and a display device having relatively small display area.

The search device 200 functions as multiple search sites. The multiple search sites each holds a search page, and the search device 200 has a function of providing search results retrieved by using each of the multiple search pages to the information processing apparatus 100. In the present embodiment, although the description will be made of the case where the search device 200 includes one device and the one device functions as multiple search sites, the search device 200 may include multiple devices. For example, respective multiple devices included in the search device 200 may function as one search site.

A display device C1 functions as an example of a device which transmits content detailed information to the information processing apparatus 100. When the display device C1 reproduces and displays content, a user can view the content displayed by the display device C1. For example, while viewing the content displayed by the display device C1, the user enters operation information that designates the content to the information processing apparatus 100. Subsequently, the operation information is caused to be contained in a content detailed information-transmission request and is transmitted to the display device C1 from the information processing apparatus 100. Next, the display device C1 determines content designated by the user based on the operation information, and transmits content detailed information, which corresponds to detailed information of the content, to the information processing apparatus 100 as a response to the content detailed information-transmission request.

When the information processing apparatus 100 displays the content detailed information transmitted from the display device C1, the user finds a keyword which the user wants to use for a search from the content detailed information, and enters operation information which designates the found keyword in the information processing apparatus 100. The information processing apparatus 100 can specify the keyword based on the operation information, and can use the specified keyword as the search information. A recording device C2 also functions, in the same manner as the display device C1, as an example of a device which transmits content detailed information to the information processing apparatus 100. The display device C1 and the recording device C2 build a home network with the information processing apparatus 100, for example.

As a technique for the information processing apparatus 100 to acquire search information, the technique of acquiring search information from the display device C1 or the recording device C2 may be adopted as described above. However, the technique for the information processing apparatus 100 to acquire the search information is not particularly limited. For example, the information processing apparatus 100 can use information entered by the user as the search information. Further, for example, the information processing apparatus 100 may acquire an ID for identifying content from the display device C1 or the recording device C2, and, based on the acquired ID, may acquire content detailed information from a predetermined server.

Further, for example, the information processing apparatus 100 may receive content analysis results which is obtained by analyzing content by the display device C1 or the recording device C2, and may acquire content detailed information from a predetermined server based on the received content analysis results. Also, the information processing apparatus 100 may receive content from the display device C1 or the recording device C2, may acquire content analysis results by analyzing the received content, and may acquire content detailed information from a predetermined server based on the acquired content analysis results. The content detailed information may be any information as long as it is information related to the content, and may be a creator, a title, and a cast of the content, for example. Further, in the case where the content is music, the content detailed information may be the lyrics of the music.

In the present embodiment, there will be described a technique for saving user's efforts of setting search information for each of multiple search pages and transmitting the search information to the search device 200, and acquiring search results retrieved by using each of the multiple search pages by entering the search information once. According to the technique, the user can easily view respective search results retrieved and obtained from multiple search sites based on the same piece of search information.

1-2. Functional Configuration of Information Processing Apparatus

Figure 2:
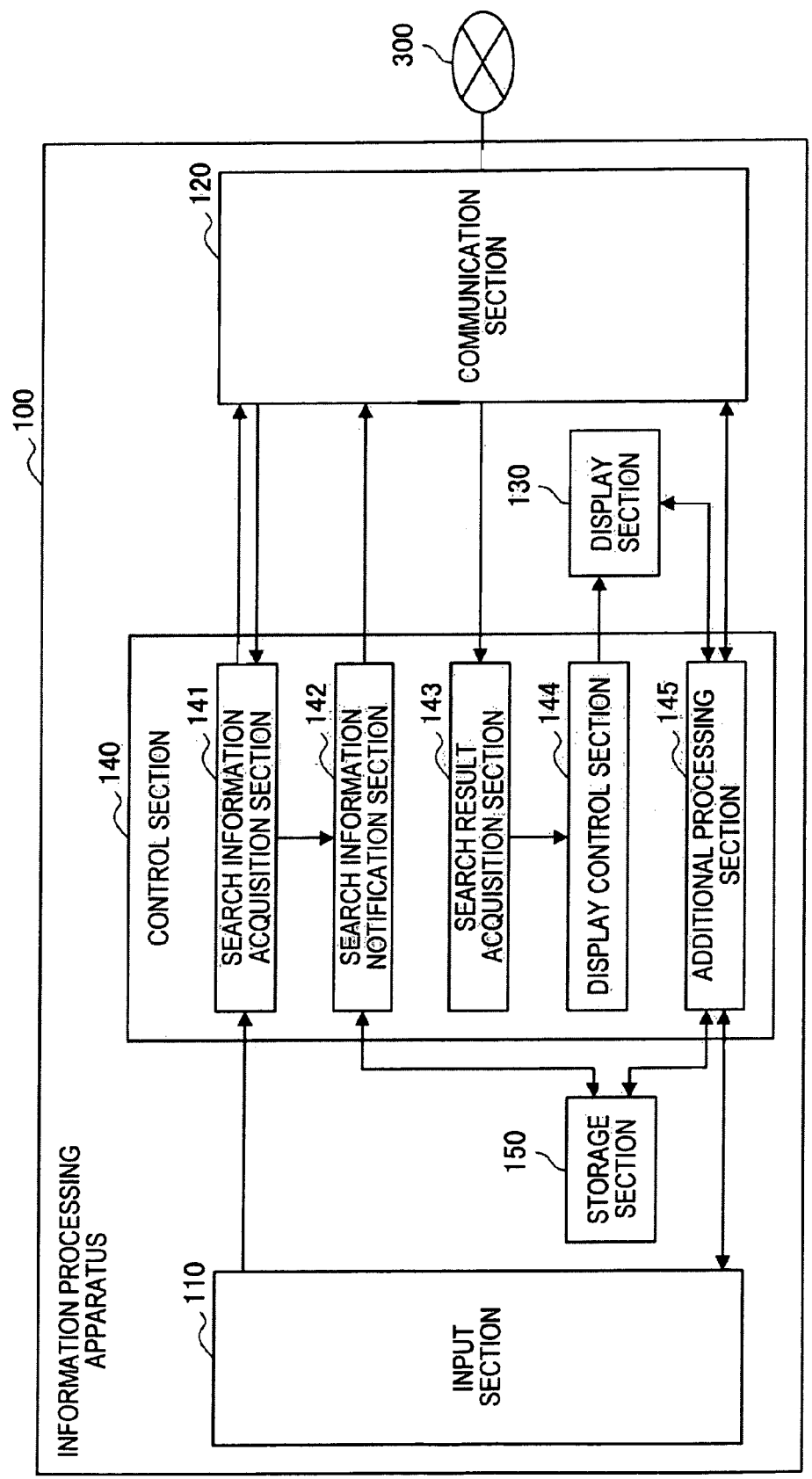
FIG. 2 is a diagram showing a functional configuration of an information processing apparatus according to the embodiment.

FIG. 2 is a diagram showing a functional configuration of an information processing apparatus according to the embodiment of the present invention. With reference to FIG. 2, the functional configuration of the information processing apparatus according to the embodiment will be described.

As shown in FIG. 2, the information processing apparatus 100 includes an input section 110, a communication section 120, a display section 130, a control section 140, and a storage section 150.

The input section 110 has a function of accepting an input of operation information from a user. The input section 110 includes an input device, for example, and as the input section 110, there can be used a touch panel, a keyboard, a mouse, and a button, for example. However, in the present embodiment, a case of using a touch panel as the input section 110 will be particularly described.

The communication section 120 has a function of communicating with the search device 200 via the network 300. The communication section 120 includes a communication device, for example. Further, in the case where the information processing apparatus 100 acquires the content detailed information from a predetermined server as described above, the communication section 120 is also capable of communicating with the predetermined server via the network 300. In addition thereto, the communication section 120 is also capable of communicating with a device connected to the network 300, as necessary.

The display section 130 has a function of displaying information output from the control section 140. The display section 130 includes a display device, for example, and as the display section 130, there can be used a CRT (Cathode Ray Tube), an LCD (Liquid Crystal Display), a PDP (Plasma Display Panel), and an ELD (Electro-Luminescence Display), for example.

The control section 140 has a function of controlling operation of the information processing apparatus 100. The control section 140 includes a CPU (Central Processing Unit) and a RAM (Random Access Memory), for example. The function of the control section 140 can be realized by developing a program stored in the storage section 150 in the RAM by the CPU, and executing the program developed in the RAM by the CPU. The control section 140 includes a search information acquisition section 141, a search information notification section 142, a search result acquisition section 143, a display control section 144, and an additional processing section 145. The additional processing section 145 will be described later.

The search information acquisition section 141 has a function of acquiring search information. There are various techniques for the search information acquisition section 141 to acquire the search information as described above. For example, the search information acquisition section 141 acquires content detailed information from the display device C1 or the recording device C2 via the communication section 120, and acquires search information from the content detailed information based on operation information input by the user.

The search information notification section 142 has a function of notifying a search device 200 of the search information acquired by the search information acquisition section 141 via the communication section 120. The search device 200, which is a notification destination of the search information, may be decided based on information stored in the storage section 150, for example. That is, the search information notification section 142 acquires multiple pieces of search page position information stored in the storage section 150. The search information notification section 142 acquires multiple search pages which are located at positions indicated by the acquired multiple pieces of search page position information, respectively, and, by using the acquired multiple search pages, notifies the search device 200 which holds search pages of the search information. As the search page position information, a URL (Uniform Resource Locator) indicating a position at which a search page is located can be used, for example.

The search result acquisition section 143 has a function of acquiring multiple search result pages retrieved from the multiple search pages, respectively, in accordance with the search information via the communication section 120.

The display control section 144 has functions of causing the display section 130 to display one of the multiple search result pages acquired from the search device 200 by the search result acquisition section 143, and causing the display section 130 to display another one of the multiple search result pages based on the operation information the input of which is accepted by the input section 110.

The storage section 150 has a function of storing data and program to be used by the control section 140. The storage section 150 includes an HDD (Hard Disk Drive) and a semiconductor memory, for example. The storage section 150 stores multiple pieces of search page position information indicating respective positions of the multiple search pages in the network 300. Further, the storage section 150 may also store search information-entry position information, which indicates a position of a search information-entry field in the search page located at a position indicated by each of the multiple pieces of search page position information, and which is correlated with each of the multiple search page position information. The search information-entry position information is mainly used by the search information notification section 142.

According to the configuration as described above, when viewing search results retrieved from multiple search sites, it is not necessary any more that the user using the information processing apparatus 100 perform operations of entering search information and pressing a search button in respective search pages provided by the multiple search sites. Therefore, the present embodiment has an effect that burdens of performing those operations imposed on the user are eliminated. According to the present embodiment, it becomes possible to easily view respective search results retrieved and obtained from multiple search sites based on the same piece of search information.

Here, it is generally necessary that the search information notification section 142 acquires multiple search pages from the search device 200 before notifying the search device 200 of the search information. The search information notification section 142 causes the display section 130 to display the multiple search pages acquired from the search device 200, and causes the user to perform an operation of setting search information in search information-entry fields of multiple search pages. When the operation of setting search information in the search information-entry fields of multiple search pages is performed by the user, the search information notification section 142 notifies the search device 200 of search information-entry position information indicating a position of a search information-entry field of each of the multiple search pages and the search information set at the position. Accordingly, the search device 200 can determine that the search information which the search device 200 is notified of from the information processing apparatus 100 is set at the position indicated by the search information-entry position information which the search device 200 is notified of from the information processing apparatus 100, and that a search operation is performed by the user.

However, if the search information-entry position information is stored in the storage section 150, the operation of setting search information in the search information-entry fields performed by the user can be omitted. That is, the search information notification section 142 may further acquire search information-entry position information which is correlated with each of the multiple search page position information and stored in the storage section 150, and may further notify the search device 200 of the acquired search information-entry position information.

1-3. Functional Configuration of Search Device

Figure 3:
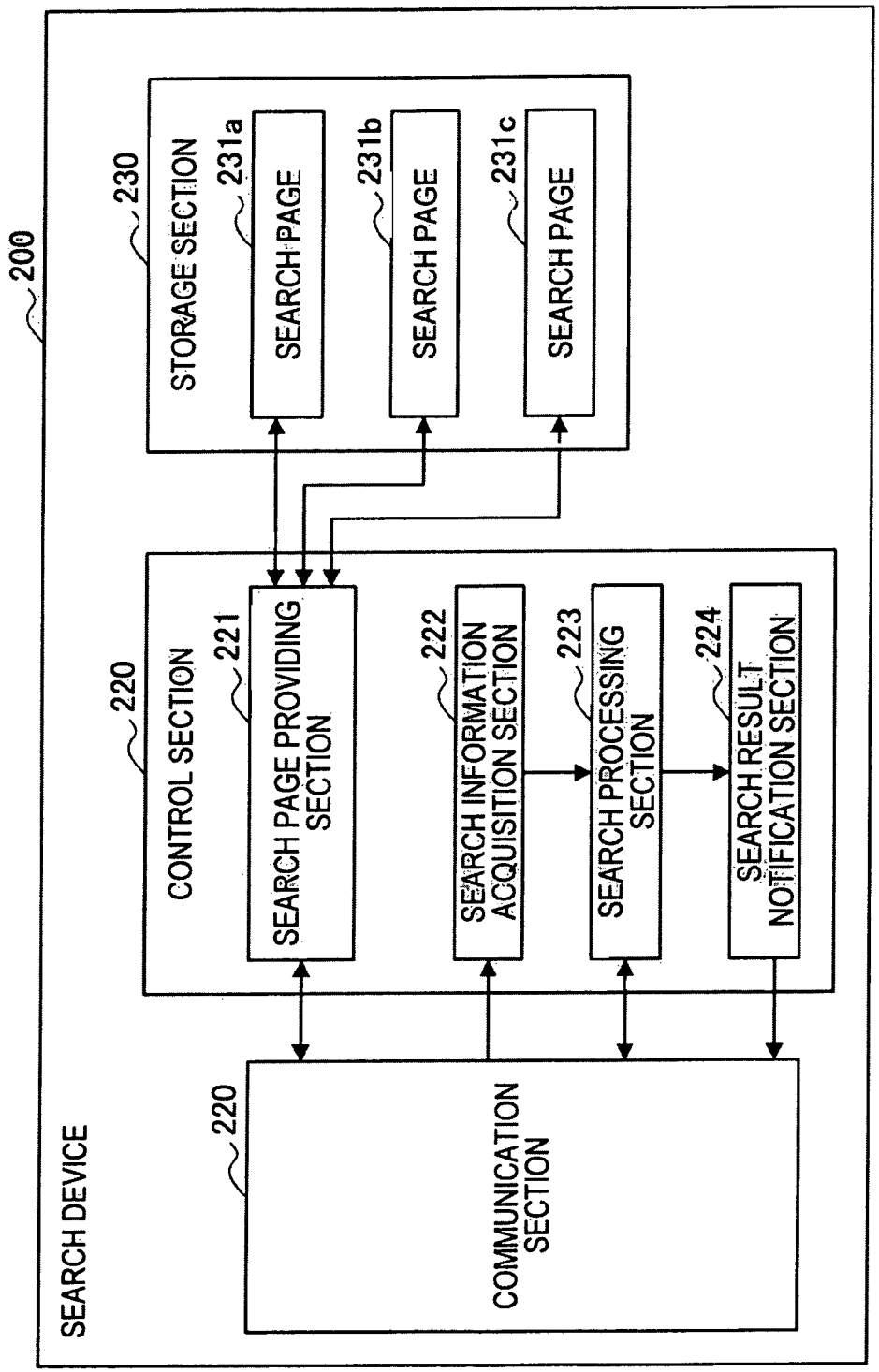
FIG. 3 is a diagram showing a functional configuration of a search device according to the embodiment.

FIG. 3 is a diagram showing a functional configuration of a search device according to the embodiment of the present invention. With reference to FIG. 3, the functional configuration of the search device according to the embodiment will be described.

As shown in FIG. 3, the search device 200 includes a communication section 210, a control section 220, and a storage section 230.

The communication section 210 has a function of communicating with the information processing apparatus 100 via the network 300. The communication section 210 includes a communication device, for example. Further, in addition thereto, the communication section 210 is capable of communicating with a device connected to the network 300 as necessary.

The control section 220 has a function of controlling operation of the search device 200. The control section 220 includes a CPU and a RAM, for example. The function of the control section 220 can be realized by developing a program stored in the storage section 230 in the RAM by the CPU, and executing the program developed in the RAM by the CPU. The control section 220 includes a search page providing section 221, a search information acquisition section 222, a search processing section 223, and a search result notification section 224.

The search page providing section 221 has a function of providing a search page 231a, a search page 231b, and a search page 231c to the information processing apparatus 100 via the communication section 210. Here, although a case where the number of search pages is three is described, the number of search pages to be provided is not limited to three, and may be any as long as it is two or more. The search pages 231a to 231c are each a top page provided by a search site, for example, and when acquiring position information indicating a position of a search page from the information processing apparatus 100 via the communication section 210, the search page providing section 221 provides the search page located at the position indicated by the received position information to the information processing apparatus 100 via the communication section 210.

The search information acquisition section 222 has a function of acquiring the search information from the information processing apparatus 100 via the communication section 210. The search information acquired here is information which the search device 200 is notified of from the information processing apparatus 100 by using the search page provided by the search page providing section 221, for example. Further, as described above, the search information acquisition section 222 can also acquire, together with search information, search information-entry position information in which the search information is set. Accordingly, the search information acquisition section 222 can determine that the search information is set in a search information-entry field and that a search operation is performed, based on the combination of the search information which the search device 200 is notified of from the information processing apparatus 100 and the search information-entry position information.

The search processing section 223 has a function of acquiring multiple search result pages by performing a search in the multiple search pages, respectively, in accordance with the search information acquired by the search information acquisition section 222. The search performed by the search processing section 223 with respect to each of the multiple search pages may be any. As the search performed with respect to each of the multiple search pages, the search processing section 223 can execute a search of a web page in accordance with the search information, for example.

Further, as the search performed with respect to each of the multiple search pages, the search processing section 223 can execute a search of information related to a commercial product that can be purchased by a user, a search of moving image information that can be viewed by the user, and a search of text information including a content that the user wants to research, for example. The information related to a commercial product, the moving image information that can be viewed by the user, and the text information including a content that the user wants to research, which are to be search targets, may be written on the web page or may be stored in the storage section 230 of the search device 200.

Note that the algorithm of the search performed with respect to each of the multiple search pages by the search processing section 223 may be identical or may be different from one search page to another. The search processing section 223 performs a search based on respective algorithms, and generates search result pages for respective acquired search results.

The search result notification section 224 has a function of notifying the information processing apparatus 100 of the multiple search result pages acquired by the search processing section 223 via the communication section 210.

Figure 4:
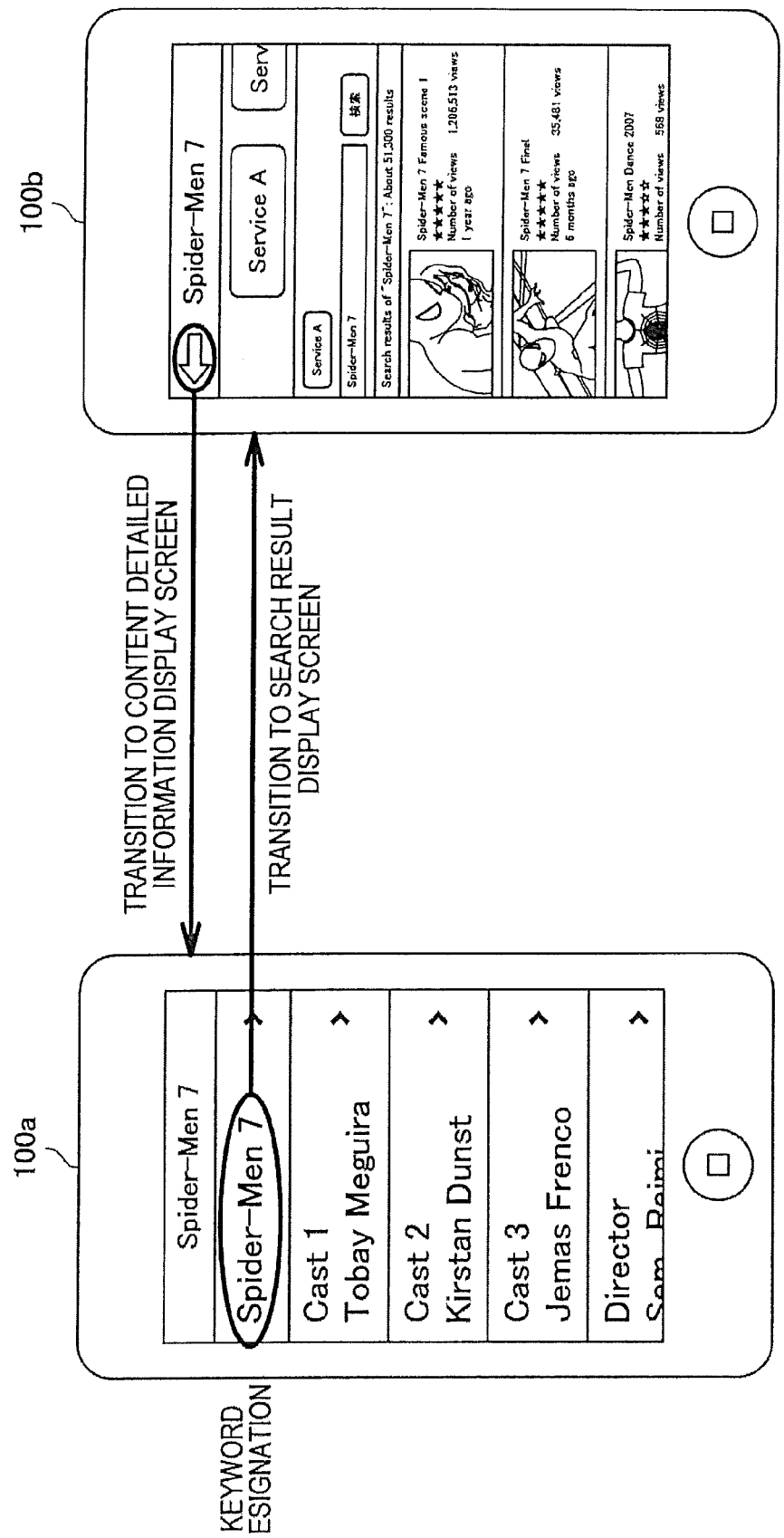
FIG. 4 is a diagram showing an example of screen transition between a content detailed information display screen and a search result display screen which are displayed by the information processing apparatus according to the embodiment.

1-4. Screen Transition Between Content Detailed Information Display Screen and Search Result Display Screen FIG. 4 is a diagram showing an example of screen transition between a content detailed information display screen and a search result display screen which are displayed by the information processing apparatus according to the embodiment of the present invention. With reference to FIG. 4, the example of screen transition between a content detailed information display screen and a search result display screen which are displayed by the information processing apparatus according to the embodiment will be described.

As shown in FIG. 4, a content detailed information display screen is displayed on an information processing apparatus 100a, and a search result display screen is displayed on an information processing apparatus 100b. As described above, for example, the search information acquisition section 141 acquires content detailed information from the display device C1 or the recording device C2 via the communication section 120, and acquires search information from the content detailed information based on operation information input by the user. For example, when an input of operation information for selecting a title name "Spider-Men 7" as an example of the content detailed information displayed on the information processing apparatus 100a is accepted by the input section 110, the search information acquisition section 141 determines, based on the operation information, that the title name "Spider-Men 7" is selected and acquires the title name "Spider-Men 7" as search information.

The search information notification section 142 notifies the search device 200 of the title name "Spider-Men 7", which is the search information acquired by the search information acquisition section 141, via the communication section 120. Here, the search information notification section 142 notifies the search sites each providing "Service A", "Service B", or "Service C" of the title name "Spider-Men 7" via the communication section 120. The search result acquisition section 143 acquires, from the search device 200 via the communication section 120, multiple search result pages retrieved by the search sites each providing "Service A", "Service B", or "Service C" in accordance with the title name "Spider-Men 7".

The display control section 144 causes the display section 130 to display one of the multiple search result pages acquired by the search result acquisition section 143 from the search device 200. On the information processing apparatus 100b, a search result page which is acquired by the search result acquisition section 143 from a search site providing "Service A" is displayed as a search result display screen.

There is considered a case where, in a state where the search result page acquired from a search site providing "Service A" is displayed on the information processing apparatus 100b, an operation for returning the display to a content detailed information display screen is performed by the user. In that case, a transition is performed from state where the search result page acquired from the search site providing "Service A" is displayed to the state where the content detailed information display screen is displayed. There can be assumed various operations for returning the display to a content detailed information display screen.

For example, there is considered a case where, by the user designating "right", a transition is performed from the display of the search result page acquired from the search site providing "Service A" to a display of a search result page acquired from the search site providing "Service B", as will be described later. In that case, the transition to the display of the content detailed information display screen is performed by the user designating "left", which is an opposite direction used for performing transition to the display of the search result page acquired from the search site providing "Service B". The designation of "left" by the user is performed by the user selecting a left arrow displayed on the information processing apparatus 100b, for example.

1-5. Configuration Example of Search Result Display Screen

Figure 5:
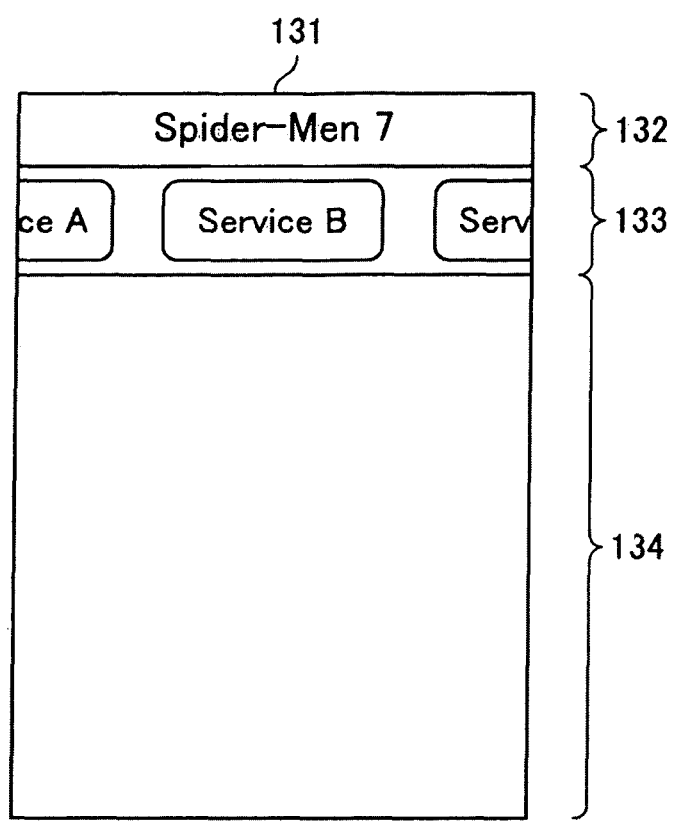
FIG. 5 is a diagram showing a configuration example of a search result display screen displayed by the information processing apparatus according to the embodiment.

FIG. 5 is a diagram showing a configuration example of a search result display screen displayed by the information processing apparatus according to the embodiment of the present invention. With reference to FIG. 5, the configuration example of the search result display screen displayed by the information processing apparatus according to the embodiment will be described.

As shown in FIG. 5, on the information processing apparatus 100b (refer to FIG. 2), a search result display screen 131 is displayed. In the search result display screen 131, there are provided a keyword display area 132, a web service switching area 133, and a search result display area 134. In the keyword display area 132, the title name "Spider-Men 7", which is the search information acquired by the search information acquisition section 141, is displayed. In the web service switching area 133, there is displayed a web service "Service B", which is a providing source of the search result currently being displayed on the search result display area 134. Note that a web service is an expression which normally includes a search service provided by a search site, and refers to a site which provides a service on the Web. On the search result display area 134, search results are displayed.

1-6. Example of Screen Transition Between Search Result Display Screens

FIG. 6 is a diagram showing an example of screen transition between search result display screens which are displayed by the information processing apparatus according to the embodiment of the present invention. With reference to FIG. 6, the example of screen transition between search result display screens which are displayed by the information processing apparatus according to the embodiment will be described.

As shown in FIG. 6, search results obtained by a search performed by a web service "Service A" are displayed on a search result display screen 131a. In this state, for example, when a user designates "right", a search result display screen 131b which includes search results obtained by a search performed by a web service "Service B" is displayed. In the same manner, in this state, for example, when the user designates "right", a search result display screen 131c which includes search results obtained by a search performed by a web service "Service C" is displayed.

Further, when the user designates "left" in the state where the search result display screen 131c which includes search results obtained by a search performed by the web service "Service C" is displayed, there is displayed the search result display screen 131b which includes search results obtained by a search performed by the web service "Service B". In the same manner, when the user designates "left" in the state where the search result display screen 131b which includes search results obtained by a search performed by the web service "Service B" is displayed, there is displayed the search result display screen 131a which includes search results obtained by a search performed by the web service "Service A".

That is, the display control section 144 included in the information processing apparatus 100 causes the display section 130 to display one search result page, which is different from the search result page currently being displayed, from among multiple search result pages, based on the operation information the input of which is accepted by the input section 110. In particular, in the case where the input section 110 includes a touch panel and when the input section 110 accepts an input of a flick operation in right/left direction on the web service switching area 133, the search result display screen 131 may be switched in accordance with the direction indicated by the flick operation.

Figure 7:
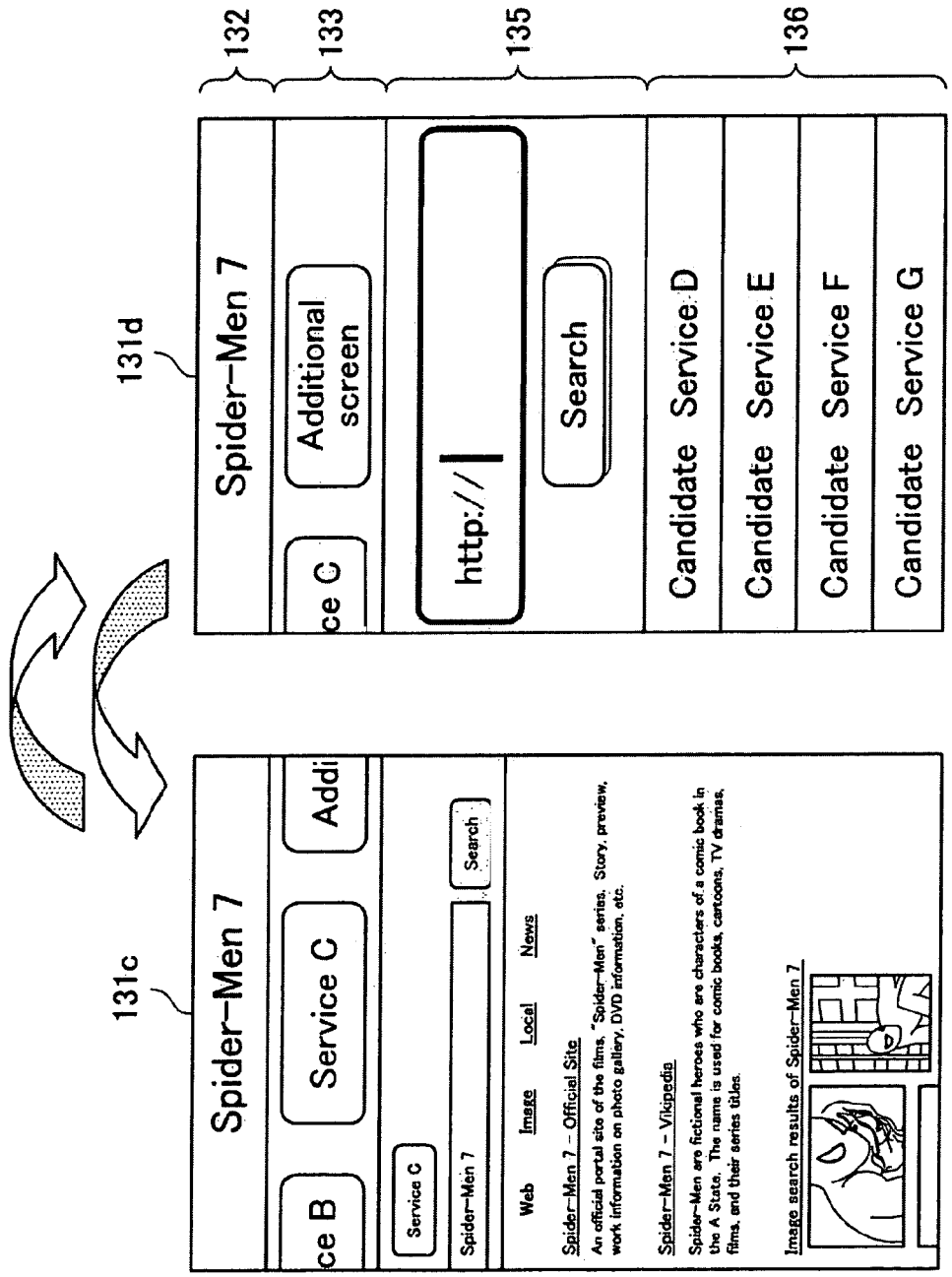
FIG. 7 is a diagram showing an example of screen transition between a search result display screen and a registration screen which are displayed by the information processing apparatus according to the embodiment.

1-7. Example of Screen Transition Between Search Result Display Screen and Registration Screen FIG. 7 is a diagram showing an example of screen transition between a search result display screen and a registration screen which are displayed by the information processing apparatus according to the embodiment of the present invention. With reference to FIG. 7, the example of screen transition between a search result display screen and a registration screen which are displayed by the information processing apparatus according to the embodiment will be described.

As shown in FIG. 7, there is displayed the search result display screen 131c which includes search results obtained by a search performed by the web service "Service C". In this state, for example, when a user designates "right", a web service additional screen 131d is displayed. It is possible that the user uses the web service additional screen 131d and newly adds a search site which provides search results, as will be described later. The function of newly adding a search site which provides search results is mainly possessed by the additional processing section 145. That is, the additional processing section 145 adds new search page position information to the multiple pieces of search page position information stored in the storage section 150.

In the web service additional screen 131d, there are mainly provided a keyword display area 132, a web service switching area 133, an additional web service search area 135, and an additional web service candidate display area 136. The content displayed in the keyword display area 132 provided in the web service additional screen 131d is the same as the content displayed in the keyword display area 132 provided in the search result display screen 131. In the contents displayed in the web service switching area 133 provided in the web service additional screen 131d, the contents corresponding to the web service additional screen 131d are displayed.

The additional web service candidate display area 136 is an area used for displaying a web service candidate to be added. In the example shown in FIG. 7, there are displayed in the additional web service candidate display area 136, as web service candidates to be added, "Candidate Service D", "Candidate Service E", "Candidate Service F", and "Candidate Service G". When one of the web service candidates displayed in the additional web service candidate display area 136 is designated by the user, the designated web service is registered as a web service which provides search results to the information processing apparatus 100.

That is, the storage section 150 stores beforehand a URL of the web service candidate to be added as candidate search page position information. When operation information for selecting any one of the pieces of candidate search page position information is input by the input section 110, the additional processing section 145 newly adds the candidate search page position information selected by the operation information to the multiple pieces of search page position information stored in the storage section 150. By adding the candidate search page position information, the number of search result display screens 131 which are each a switch target increases.

The additional web service search area 135 is an area used for retrieving a web service which the user wants to add. When the user sets an URL in the additional web service search area 135 and selects a "Search" button, a search page designated by the URL is displayed, for example, in the additional web service candidate display area 136. The user may also perform operations of setting a keyword in the additional web service search area 135 and selecting the "Search" button. In that case, a search page containing the keyword is retrieved by a predetermined search site, and the retrieved search page is displayed, for example, in the additional web service candidate display area 136. The predetermined search site as used herein may be any search page.

Further, the meaning of notifying the search device 200 of search information-entry position information, which indicates a position of a search information-entry field, in addition to search information is as described above. Therefore, when newly adding a web service, the search information-entry position information indicating a position of the search information-entry field of the page may be stored in the storage section 150 in addition to the search page position information. In this way, the burden of setting the search information in a search page of the added web service can be eliminated.

That is, the additional processing section 145 acquires a new search page located at a position indicated by the new search page position information via the communication section 120. The additional processing section 145 acquires, from the acquired new search page, search information-entry position information indicating a position of a search information-entry field in the new search page, and causes the storage section 150 to store the acquired search information-entry position information which is correlated with the new search page position information. Thus, the additional processing section 145 can autonomously acquire the search information-entry position information indicating the position of the search information-entry field from the new search page, and can store the search information-entry position information in the storage section 150.

Further, the additional processing section 145 may cause the display section 130 to display the acquired new search page, may specify an entry field being focused on in the new search page displayed by the display section 130, and may determine that the specified entry field is the search information-entry field. There may be a case where any one of the entry field is already being focused on at the stage of displaying the new search page on the display section 130, and there may be a case where, when an entry field is selected by the user, then the selected entry field is focused.

Further, the additional processing section 145 may notify the search device 200 of the search information and the acquired search information-entry position information via the communication section 120. In this way, the search device 200 can determine that the search information is set in the search information-entry field, based on the search information and the search information-entry position information which the search device 200 is notified of from the information processing apparatus 100. Accordingly, the burden of setting the search information in the search information-entry field by the user can be eliminated, and the search results retrieved based on the search information can be displayed on the additional web service candidate display area 136.

1-8. Search Processing Executed by Information Processing System

Figure 8:
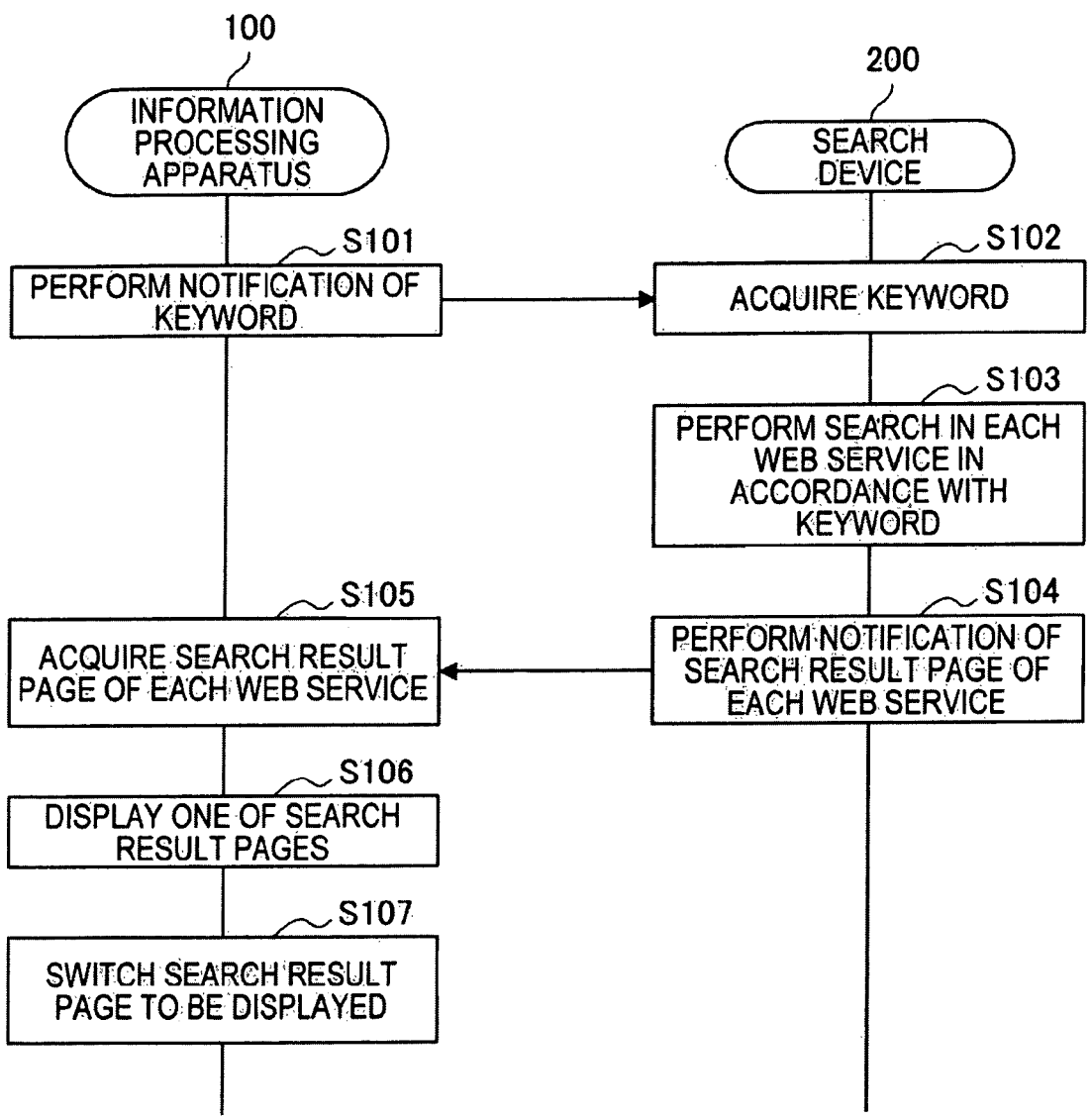
FIG. 8 is a sequence diagram showing a flow of search processing executed by the information processing system according to the embodiment.

FIG. 8 is a sequence diagram showing a flow of search processing executed by the information processing system according to the embodiment of the present invention. With reference to FIG. 8, the flow of search processing executed by the information processing system according to the embodiment will be described.

As shown in FIG. 8, the search information notification section 142 of the information processing apparatus 100 notifies the search device 200 of a keyword as an example of search information via the communication section 120 (Step S101). The search information acquisition section 222 of the search device 200 acquires the keyword via the communication section 210 (Step S102). Next, the search processing section 223 performs a search in each web service in accordance with the keyword (Step S103). The search result notification section 224 notifies the information processing apparatus 100 of a search result page of each web service via the communication section 210 (Step S104).

Subsequently, the search result acquisition section 143 acquires the search result page of each web service (Step S105), and the display control section 144 causes the display section 130 to display one of the search result pages (Step S106). The display control section 144 switches a search result page to be displayed based on operation information the input of which is accepted by the input section 110 (Step S107).

1-9. Web Service Registration Processing Executed by Information Processing Apparatus FIG. 9 is a flowchart showing a flow of web service registration processing executed by the information processing apparatus according to the embodiment of the present invention. With reference to FIG. 9, the flow of web service registration processing executed by the information processing apparatus according to the embodiment will be described.

The web service registration processing shown in FIG. 9 starts from the state where the web service additional screen 131*d* is displayed on the information processing apparatus 100. As shown in FIG. 9, the additional processing section 145 of the information processing apparatus 100 determines whether or not any one of additional web service candidates is selected (Step S201). In the case where the additional processing section 145 determines that any one of additional web service candidates is selected ("YES" in Step S201), the processing proceeds to Step S205. In the case where it is determined that any one of additional web service candidates is not selected ("NO" in Step S201), the additional processing section 145 accepts an input of a URL or a keyword of a web service to be added (Step S202).

The additional processing section 145 retrieves a web service to be added (Step S203) based on the URL or the keyword, the input of which is accepted, and determines whether or not a corresponding web service exists (Step S204). In the case where the additional processing section 145 determines that a corresponding web service does not exist ("NO" in Step S204), the processing returns to Step S202. In the case where the additional processing section 145 determines that a corresponding web service exists ("YES" in Step S204), the processing proceeds to Step S205.

Subsequently, the additional processing section 145 causes the display section 130 to display a top screen of an additional web service (Step S205), and determines whether or not a search box of the additional web service is being focused on (Step S206). Here, the top screen of the additional web service corresponds to the search page of the additional web service in the example described above, and the search box corresponds to the search information-entry field in the example described above.

In the case where the additional processing section 145 determines that the search box of the additional web service is being focused on ("YES" in Step S206), the processing proceeds to Step S208. In the case where it is determined that the search box of the additional web service is not being focused on ("NO" in Step S206), the additional processing section 145 determines whether or not the search box is designated by the user (Step S207). In the case where the additional processing section 145 determines that the search box is designated by the user ("YES" in Step S207), the processing proceeds to Step S208, and in the case where the additional processing section 145 determines that the search box is not designated by the user ("NO" in Step S207), the processing proceeds to Step S210.

Subsequently, the additional processing section 145 automatically enters a keyword being designated into the search box of the additional web service (Step S208), and causes the display section 130 to display the search results using the additional web service (Step S209). The additional processing section 145 registers the additional web service and the position of the search box in the storage section 150 (Step S210), and completes the web service registration processing.

2. Modified Example

It should be understood by those skilled in the art that various modifications, combinations, sub-combinations and alterations may occur depending on design requirements and other factors insofar as they are within the scope of the appended claims or the equivalents thereof.

3. Summary

According to the present embodiment, it becomes possible for the user to easily view respective search results retrieved and obtained from multiple search sites based on the same piece of search information by using the information processing apparatus. The user has only to designate one piece of search information to thereby obtain and view search results which are retrieved based on the search information from among previously set multiple search sites.

In particular, when a display area of the information processing apparatus is small, for example, there are many cases where the number of search results that can be displayed at once is limited. According to the information processing apparatus of the present embodiment, the search results to be displayed can be switched based on operation information entered by the user. Therefore, the information processing apparatus according to the present embodiment is particularly effective when used in the case where the number of search results that can be displayed at once is limited.

Further, in the case where the input section of the information processing apparatus of the present embodiment includes a touch panel, a flick operation input by the user is detected by the touch panel, and the search results to be displayed can be easily switched based on the detected flick operation.

Still further, according to the present embodiment, it is possible that the user adds a search site which the user wants to newly add. Moreover, it is also possible to add, in combination therewith, search information-entry position information, which indicates a position of a search information-entry field in a search page (e.g. top page) of the search site which the user wants to newly add. In this way, because a designated keyword is automatically set in the search information-entry field, the burden of setting the search information in the search information-entry field by the user can be eliminated.

What is claimed is:

1. An information processing apparatus comprising:
   a communication section which communicates via a network with a search device for providing search results;
   a search information notification section which notifies the search device of search information via the communication section; and
   a search result acquisition section which acquires search results in accordance with the search information, from the search device via the communication section,
   wherein the information processing apparatus acquires content detailed information from another device via the communication section,
   wherein the search information is acquired from the content detailed information based on user selection of content detailed information that is displayed by the information processing apparatus, and
   wherein the information processing apparatus is operable to display the search results in a search result display screen that includes an area for designating switching to a content detailed information display screen, and an area for designating switching between search result display screens for respective search services, in which each of the search result display screens includes search results from a single search service of the respective search services, and designating switching to a service adding display screen,
   in which, in response to an operation in a direction on the area for designating switching between search result display screens when search results of a respective first search service of the search services is displayed on a first search result display screen, the information processing apparatus switches display from the first search result display screen to a second search result display screen on which a second search result of a respective second search service of the search services is displayed, the second search service corresponding to an indication displayed in the area for designating switching between search result display screens of the first search result display screen and positioned in the direction in relation to another indication corresponding to the first search service simultaneously displayed in the area for designating switching between search result display screens on the first search result display screen.

2. The information processing apparatus according to claim 1, wherein the another device is any device having a display section and/or a storage section capable of transmitting content detailed information to the information processing apparatus, and wherein the content detailed information is either stored in the storage section of the another device or obtained by the another device over a network like the Internet.

3. The information processing apparatus according to claim 2, further comprising:
   an input section which accepts an input of operation information from a user;
   a display section; and
   a display control section which causes the display section to display the search results acquired by the search result acquisition section from the search device, and which causes the display section to display other search results based on the operation information an input of which is accepted by the input section,
   wherein the search information is acquired from the content detailed information based on operation information input by the user.

4. The information processing apparatus according to claim 3, wherein the search device holds a plurality of search pages, wherein the search results are a plurality of search result pages retrieved from the plurality of search pages, respectively, and wherein the display control section causes the display section to display one of the plurality of search result pages acquired by the search result acquisition section from the search device, and which causes the display section to display another one of the plurality of search result pages based on the operation information an input of which is accepted by the input section.

5. The information processing apparatus according to claim 4, further comprising
   a storage section which stores a plurality of pieces of search page position information indicating positions of the plurality of search pages in the network, respectively,
   wherein the search information notification section acquires the plurality of pieces of search page position information stored in the storage section, acquires the plurality of search pages located at positions indicated by the acquired plurality of pieces of search page position information, respectively, and notifies the search device of the search information by using the acquired plurality of search pages.

6. The information processing apparatus according to claim 5,
wherein the storage section stores search information-entry position information, which indicates a position of a search information-entry field in the search page located at a position indicated by each of the plurality of pieces of search page position information, and which is correlated with each of the plurality of pieces of search page position information, and
wherein the search information notification section further acquires the search information-entry position information which is correlated with each of the plurality of pieces of search page position information and stored in the storage section, and further notifies the search device of the acquired search information-entry position information.

7. The information processing apparatus according to claim 5, further comprising
an additional processing section which adds new search page position information to the plurality of pieces of search page position information stored in the storage section.

8. The information processing apparatus according to claim 7,
wherein the additional processing section acquires a new search page located at a position indicated by the new search page position information, acquires, from the acquired new search page, search information-entry position information indicating a position of a search information-entry field in the new search page, and causes the storage section to store the acquired search information-entry position information which is correlated with the new search page position information.

9. The information processing apparatus according to claim 8,
wherein the storage section further stores candidate search page position information which is a candidate for the new search page position information, and
wherein, when the additional processing section determines that the candidate search page position information is selected based on the operation information an input of which is accepted by the input section, the additional processing section adds the candidate search page position information, which is determined to have been selected, to the plurality of pieces of search page position information.

10. An information processing method performed by an information processing apparatus which includes a communication section which performs communication via a network with a search device for providing search results, a search information notification section, and a search result acquisition section, the information processing method comprising the steps of:
acquiring, by the information processing apparatus, content detailed information from another device via the communication section; and
when search information is acquired from the content detailed information based on user selection of content detailed information that is displayed by the information processing apparatus, notifying, by the search information notification section, the search device of search information via the communication section and acquiring search results in accordance with the search information, by the search result acquisition section, from the search device via the communication section, and
wherein the information processing apparatus is operable to display the search results in a search result display screen that includes an area for designating switching to a content detailed information display screen, and an area for designating switching between search result display screens for respective search services, in which each of the search result display screens includes search results from a single search service of the respective search services, and designating switching to a service adding display screen,
in which, in response to an operation in a direction on the area for designating switching between search result display screens when search results of a respective first search service of the search services is displayed on a first search result display screen, the information processing apparatus switches display from the first search result display screen to a second search result display screen on which a second search result of a respective second search service of the search services is displayed, the second search service corresponding to an indication displayed in the area for designating switching between search result display screens of the first search result display screen and positioned in the direction in relation to another indication corresponding to the first search service simultaneously displayed in the area for designating switching between search result display screens on the first search result display screen.

11. The method as claimed in claim 10, wherein the another device is any device having a display section and/or a storage section capable of transmitting content detailed information to the information processing apparatus, and wherein the content detailed information is either stored in the storage section of the another device or obtained by the another device over a network like the Internet.

12. The method as claimed in claim 11, wherein the information processing apparatus further comprises an input section which accepts an input of operation information from a user, a display section, and a display control section; and the information processing method further comprising the steps of causing, by the display control section, the display section to display the search results acquired by the search result acquisition section from the search device, and causing, by the display control section, the display section to display other search results based on the operation information an input of which is accepted by the input section.

13. The method as claimed in claim 12, wherein the search device holds a plurality of search pages, wherein the search results are a plurality of search result pages retrieved from the plurality of search pages, respectively, and wherein, after the display control section has caused the display section to display the search result pages acquired by the search result acquisition section from the search device, the display control section, on receiving an input of operation information by the input section, causes the display section to display another one of the plurality of search result pages based on the operation information an input of which is accepted by the input section.

14. A non-transitory computer-readable medium having stored thereon a computer-readable program for causing a computer to function as an information processing apparatus which includes
a communication section which communicates via a network with a search device for providing search results, a search information notification section which notifies the search device of search information via the communication section, and a search result acquisition section which acquires search results in accordance with the search information, from the search device via the communication section, wherein the information processing apparatus acquires content detailed information from another device via the communication section, wherein the search information is acquired from the content detailed information based on user selection of content detailed information that is displayed by the information processing apparatus, and wherein the information processing apparatus is operable to display the search results in a search result display screen that includes an area for designating switching to a content detailed information display screen, and an area for designating switching between search result display screens for respective search services, in which each of the search result display screens includes search results from a single search service of the respective search services, and designating switching to a service adding display screen, in which, in response to an operation in a direction on the area for designating switching between search result display screens when search results of a respective first search service of the search services is displayed on a first search result display screen, the information processing apparatus switches display from the first search result display screen to a second search result display screen on which a second search result of a respective second search service of the search services is displayed, the second search service corresponding to an indication displayed in the area for designating switching between search result display screens of the first search result display screen and positioned in the direction in relation to another indication corresponding to the first search service simultaneously displayed in the area for designating switching between search result display screens on the first search result display screen.

15. The medium as claimed in claim 14, wherein the another device is any device having a display section and/or a storage section capable of transmitting content detailed information to the information processing apparatus, and wherein the content detailed information is either stored in the storage section of the another device or obtained by the another device over a network like the Internet.

16. The medium as claimed in claim 15, wherein the information processing apparatus further comprises an input section which accepts an input of operation information from a user, a display section, and a display control section which causes the display section to display the search results acquired by the search result acquisition section from the search device, and which causes the display section to display other search results based on the operation information an input of which is accepted by the input section, and wherein the search information is acquired from the content detailed information based on operation information input by the user.

17. The medium as claimed in claim 16, wherein the search device holds a plurality of search pages, wherein the search results are a plurality of search result pages retrieved from the plurality of search pages, respectively, and wherein the display control section causes the display section to display one of the plurality of search result pages acquired by the search result acquisition section from the search device, and which causes the display section to display another one of the plurality of search result pages based on the operation information an input of which is accepted by the input section.

18. An information processing system, comprising:
an information processing apparatus; and
another device from which the information processing apparatus acquires content detailed information, wherein the information processing apparatus includes
a communication section which communicates via a network with a search device for providing search results,
a search information notification section which notifies the search device of search information via the communication section, and
a search result acquisition section which acquires search results in accordance with the search information, from the search device via the communication section, wherein the search information is acquired from the content detailed information based on user selection of content detailed information that is displayed by the information processing apparatus, wherein the another device is any device having a display section and/or a storage section capable of transmitting content detailed information to the information processing apparatus, wherein the content detailed information is either stored in the storage section of the another device or obtained by the another device via a network like the Internet, and wherein the information processing apparatus is operable to display the search results in a search result display screen that includes an area for designating switching to a content detailed information display screen, and an area for designating switching between search result display screens for respective search services, in which each of the search result display screens includes search results from a single search service of the respective search services, and designating switching to a service adding display screen, in which, in response to an operation in a direction on the area for designating switching between search result display screens when search results of a respective first search service of the search services is displayed on a first search result display screen, the information processing apparatus switches display from the first search result display screen to a second search result display screen on which a second search result of a respective second search service of the search services is displayed, the second search service corresponding to an indication displayed in the area for designating switching between search result display screens of the first search result display screen and positioned in the direction in relation to another indication corresponding to the first search service simultaneously displayed in the area for designating switching between search result display screens on the first search result display screen.

19. The information processing system according to claim 18, wherein the information processing apparatus further comprises an input section which accepts an input of operation information from a user; a display section; and a display control section which causes the display section to display the search results acquired by the search result acquisition section from the search device, and which causes the display section to display other search results based on the operation information an input of which is accepted by the input section, and wherein the search information is acquired from the content detailed information based on operation information input by the user.

20. The information processing system according to claim 19, wherein the search device holds a plurality of search pages, wherein the search results are a plurality of search result pages retrieved from the plurality of search pages, respectively, and wherein the display control section of the information processing apparatus causes the display section of the information processing apparatus to display one of the plurality of search result pages acquired by the search result acquisition section of the information processing apparatus from the search device, and which causes the display section of the information processing apparatus to display another one of the plurality of search result pages based on the operation information an input of which is accepted by the input section of the information processing apparatus.

* * * * *